US008300956B2

(12) United States Patent
Luttmer et al.

(10) Patent No.: US 8,300,956 B2
(45) Date of Patent: Oct. 30, 2012

(54) LOSSLESS COMPRESSION OF COLOR IMAGE DATA USING ENTROPY ENCODING

(75) Inventors: Maurice L. M. Luttmer, Velden (NL); Philippe Sobczak, Cachan (FR); Julien Malik, Paris (FR)

(73) Assignee: Oce-Technologies B.V., Venlo (NL)

( * ) Notice: Subject to any disclaimer, the term of this patent is extended or adjusted under 35 U.S.C. 154(b) by 1034 days.

(21) Appl. No.: 11/658,467

(22) PCT Filed: Jul. 26, 2005

(86) PCT No.: PCT/EP2005/008723
§ 371 (c)(1),
(2), (4) Date: Apr. 13, 2007

(87) PCT Pub. No.: WO2006/010644
PCT Pub. Date: Feb. 2, 2006

(65) Prior Publication Data
US 2009/0129691 A1    May 21, 2009

Related U.S. Application Data

(60) Provisional application No. 60/591,876, filed on Jul. 29, 2004.

(51) Int. Cl.
*G06K 9/36* (2006.01)
(52) U.S. Cl. ........ 382/232; 382/238; 382/239; 382/244; 358/261; 358/461; 358/75; 358/80; 375/240.02; 375/240.12; 375/240.19
(58) Field of Classification Search .................. 382/232, 382/238, 239; 358/75, 261, 80, 461, 455; 375/240.02, 240.12, 240.19; 348/394, 409–419; 370/392
See application file for complete search history.

(56) References Cited

U.S. PATENT DOCUMENTS

| | | | | |
|---|---|---|---|---|
| 5,198,898 A * | 3/1993 | Miyata | ........................... | 358/500 |
| 5,828,789 A * | 10/1998 | Yokose et al. | ................ | 382/239 |
| 5,991,449 A * | 11/1999 | Kimura et al. | ................ | 382/238 |
| 6,188,793 B1 * | 2/2001 | Kimura et al. | ................ | 382/238 |
| 6,292,587 B1 * | 9/2001 | Toho | ............................. | 382/238 |
| 7,554,981 B2 * | 6/2009 | Kecskemeti | .................. | 370/392 |
| 2001/0036231 A1 * | 11/2001 | Easwar et al. | ........... | 375/240.19 |
| 2004/0057083 A1 * | 3/2004 | Yokose | .................... | 358/426.13 |

FOREIGN PATENT DOCUMENTS

| | | |
|---|---|---|
| JP | 50-73510 A | 6/1975 |
| JP | 4-270564 A | 9/1992 |
| JP | 11-234683 A | 8/1999 |

\* cited by examiner

*Primary Examiner* — Matthew Bella
*Assistant Examiner* — Mek Bekele
(74) *Attorney, Agent, or Firm* — Birch, Stewart, Kolasch & Birch, LLP (57) ABSTRACT

A method compresses a digital continuous tone image of pixels situated on scan lines. The method includes the steps of, for a current pixel to be encoded, said current pixel having an actual pixel value, predicting a predicted pixel value based on pixel values of at least one previously processed pixel from the same image, using a fixed rule, determining a difference parameter based on a difference value of said predicted pixel value and the actual pixel value of said current pixel to be encoded, and inspecting the difference parameter for existence of an uninterrupted series of highest order bits having a value equal to zero, removing at least part of said highest order zero bits, and, if a number of bits within predetermined limits remains, generating a compression code having a predetermined fixed length, said code indicating the number of remaining bits.

19 Claims, 7 Drawing Sheets

LOSSLESS COMPRESSION OF COLOR IMAGE DATA USING ENTROPY ENCODING

CROSS-REFERENCE TO RELATED APPLICATIONS

This nonprovisional application claims priority under 35 U.S.C. §119(e) on U.S. Provisional Application No. 60/591,876, filed on Jul. 29, 2004. This nonprovisional application also claims priority under 35 U.S.C. §120 on International Application No. PCT/EP2005/008723, filed on Jul. 26, 2005. The entirety of each of these applications is incorporated herein by reference.

BACKGROUND OF THE INVENTION

1. Field of the Invention

The present invention relates to lossless compression of continuous tone images. More particularly, the invention provides a method of compressing a digital continuous tone image of pixels situated on scan lines, each pixel having a pixel value defined by at least one color channel value, a color channel value having B bits of precision (B>1). It is to be understood that a color channel may also comprise a single black-and-white channel.

The invention also relates to a computer program product for performing the method when run on a computer and an apparatus, in particular a print controller, in which the method is implemented.

Finally, the invention relates to a method for decompressing image data that have been compressed with the present invention.

2. Description of Background Art

Pages sent to a printer are in general defined in a page description language (PDL). An example of a PDL is PostScript from Adobe Systems Inc. A PDL interpreter that runs on a computer interprets the PDL, resulting in a digital page image for each page to be printed. The page images can be in a form that can be directly passed to a print engine or they can be stored in the form of digital continuous tone images that may be further processed before they are passed to a print engine. The latter approach can be used for example when special image processing is needed, that is not available in the PDL interpreter, e.g. to convert the continuous tone image to a format that can be accepted by the print engine.

For color printers that use the latter approach, the continuous tone image has to be stored and possibly transmitted to image processing hardware. However the amount of data for a continuous tone image can be very large, e.g. for a 600 dpi continuous tone (8 bits per color channel) CMYK image of A4 size, about 140 Mbytes is needed. This means that it takes a relatively large amount of storage to store the image and that it takes a relatively long amount of time to transport it. A general solution to this problem is to compress the continuous tone image.

Figure 11:
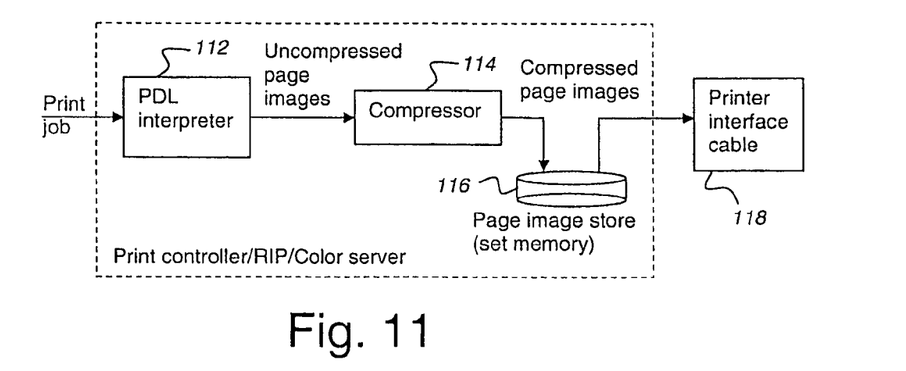
FIG. 11 is a schematic of a print controller.

For example, FIG. 11 shows a schematic of a print controller, also known as a "Raster Image Processor" (RIP) or "color server". The print controller interprets print jobs (e.g. defined in PostScript), stores the page images on disk and transfers them from there to the printer engine when required.

The color print controller contains a PDL interpreter 112 that interprets the incoming print job and converts it to uncompressed continuous tone color page images. Directly after generating the page images, they are compressed by the compressor 114 of the present invention. The resulting compressed page images are stored on a harddisk 116 which forms the page store. When the engine needs to print the job, the compressed page images are read from the harddisk and transferred to the engine through a printer interface cable 118 (e.g. Firewire).

Figure 12:
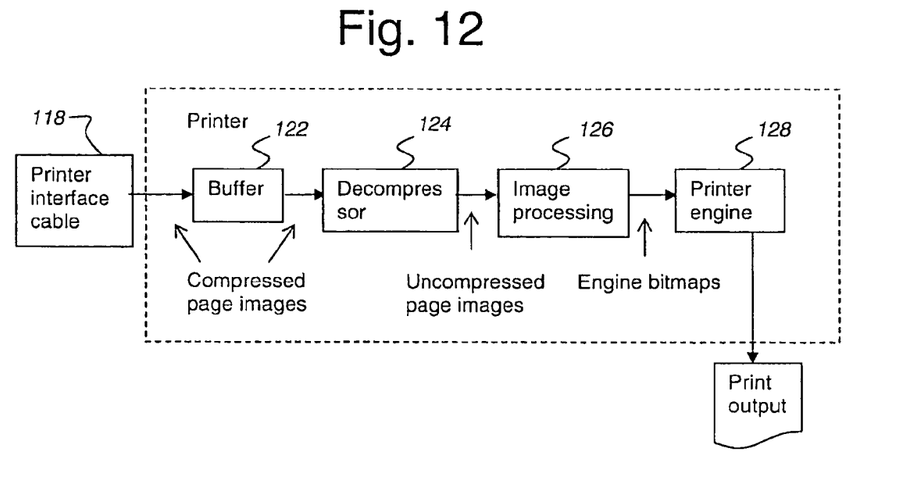
FIG. 12 is a schematic of printer.

FIG. 12 shows a printer connected to the print controller of FIG. 11 through the printer interface cable 118.

The compressed page images from the print controller are received in a buffer 122. From there, the compressed image data is passed to the decompressor 124 that converts the compressed page image to an uncompressed image. The uncompressed image is passed through the image processing module 126 to convert it to engine specific bitmaps that are used to drive the printer engine 128.

The fact that the image data is compressed directly after the PDL interpreter, saves bandwidth in the transfer of the images to and from the harddisk, allowing a slower disk to be used than would be needed for uncompressed data. It also allows for a smaller disk. Also, the bandwidth needed to transfer the images over the printer interface cable is reduced, so an interface with less available bandwidth can be used.

Various lossless image compression techniques are available for compression of continuous tone images, for instance JPEG-LS.

JPEG-LS is based on HP's LOCO-I algorithm and has been selected by the ISO/ITU-T as a standard for lossless compression of continuous tone images. A description of the algorithm is given in: M. Weinberger, G. Seroussi, G. Saipiro, "LOCO-I: A Low Complexity, Context-Based, Lossless Image Compression Algorithm", available on www.hpl.hp.com/loco/HPL-98-193R1.pdf However, the compression techniques that provide a reasonable amount of compression take considerably more time to compress an image than it takes for the PDL interpreter to generate the same image when executed on the same computer. This implies that if such a compression method would be used to compress the page images, the performance of the printer would drop to unacceptable levels.

Existing techniques that are fast enough (e.g. simple 1-dimensional run-length compression) do not provide enough compression on average.

SUMMARY OF THE INVENTION

It is an object of the invention to provide a low complexity software solution that can be implemented efficiently on a general purpose processor and that allows lossless compression of PDL generated images, with an execution time that is considerably less than the time it takes a PDL interpreter to generate the image on the same computer.

This would allow compression to be implemented on the same computer as used to run the PDL interpreter, without additional hardware and without large performance penalties.

It is a further object of the invention to provide a low complexity compressor having compression factors that are at least as good as state of the art lossless image compression algorithms.

It is a further object of the invention to allow for a simple hardware implementation of the de-compressor.

According to the method of the invention, the pixel values are compared to predicted pixel values predicted on the basis of neighboring pixels. Since in many cases pixel values do not change rapidly over position, the difference between actual and predicted pixel values is normally small, and will have several, if not many, leading zero bits. By cutting off the leading zero bits, the data is brought back to less bits, which effectively leads to compression.

Further advantageous aspects of the invention include steps used to prepare the image data in such way that the resulting differences between actual and predicted pixel values become even smaller, resulting in still better compression.

The compression is optimized for PDL-generated images, but it may also be advantageously applied to other kinds of digital images, e.g. scanned images.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

General Aspects of the Compression According to the Invention

The present invention is basically intended for compression of page images generated by a PDL (Page Description Language, such as Postscript) interpreter. Such images have specific characteristics, which are described below. The compression is optimized for these images, but it may also be applied to other kinds of digital images, e.g. scanned images. In the latter case, scanner noise negatively affects the compression ratio, but tests have revealed that a reasonable compression ratio is still attainable. A noise-suppressing preprocessing step would in this case improve the result, since it would increase the opportunities for run length compression, although the compression would then no longer be lossless.

Further, the compressor according to the present invention has been implemented in software, such that the execution time needed for compressing an image is, on average, considerably smaller than the time it takes to generate the same image by a PDL interpreter on the same computer. This allows the compressor to be implemented on the same computer that runs the PDL interpreter, without requiring additional hardware and without a large performance penalty.

The compressed format is simple, so as to allow for a simple implementation of the de-compressor in hardware. This implies among others that the amount of memory needed for the decompressor can be limited.

Also, the compressor has been designed such that it is possible for a hardware-implemented decompressor to produce decompressed pixel data at a fixed rate. This implies that the maximum local expansion of the compressed data must be limited.

Image Characteristics of Images to be Compressed

The images to be compressed are color or black-and-white continuous tone images that are preferably generated by a PDL interpreter. Unless specifically defined otherwise, the term "color" relates to both real color tones and black-and-white gray tints in the following description. PDL-generated images have certain typical characteristics:

In areas of constant color (e.g. the white background in many pages), there is no noise. This means that for compressing areas of constant color we can use simple mechanisms like run-length encoding for compression.

Figure 1:
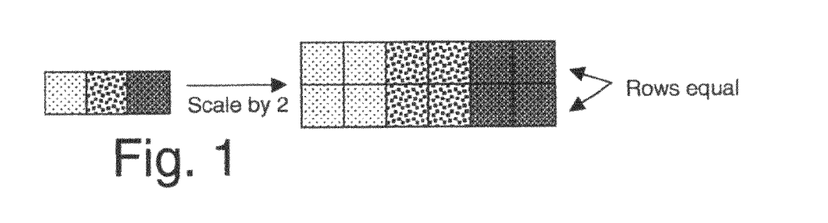
FIG. 1 illustrates image pixels scaled to a double resolution by a typical PDL interpreter.

For scaling sampled images to the device-resolution, most PDL's (like PostScript) use nearest neighbor interpolation. Nearest neighbor interpolation gives the device pixels the color of the original pixel that is closest to the device pixel. E.g., as shown in FIG. 1, for a 300-dpi image in a PostScript job printed on a 600 dpi device, each original pixel is mapped onto 2 by 2 device pixels.

A first embodiment of the present invention, which is a compression method intended for colored images, will now be described.

Compressed Image Format in the First Embodiment

The compressed image format consists of a sequence of bytes each containing two 4-bit nibbles. The first nibble in each byte is the high order 4 bits of the byte; the second nibble in each byte is the low order 4 bits of the byte. A nibble is the smallest unit of data in the compressed image format in this first embodiment. The reason for working with nibbles as smallest unit of data rather than with bits is because nibbles can be handled more efficiently on a general-purpose processor than single bits. All numbers that consist of multiple nibbles are represented with the highest order nibble first and the lowest order nibble last.

The compressed image format is organized as a sequence of information blocks that each describe one scanline, in the order in which the scanlines occur on the page. The reason for choosing a scanline-wise organization (vs. a page-wise organization) is that it allows for processing on a scanline basis without having to store a complete compressed page image.

Figure 2:
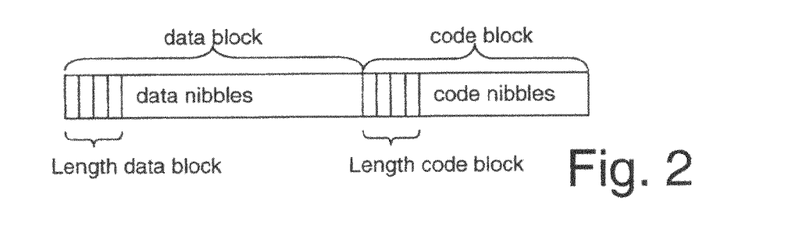
FIG. 2 illustrates an organization of data blocks and code blocks for a scanline as generated according to the invention.

FIG. 2 shows an example of the basic form of an information block for a scanline. Each information block consists of a data block immediately followed by a code block.

The first 4 nibbles in both the data and the code blocks each form a length field that specifies the length of the data/code block in multiples of 8 bytes. This length field is immediately followed by the actual code/data nibbles. Any unused nibble values at the end of a block are set to 0. A data/code block can be at most $(2^{16}-1)*8=524288$ bytes long. The length field allows navigation of the compressed data on a scanline basis (fast skipping of scanline data).

The code blocks contain a sequence of code nibbles that are instructions to the decompressor, specifying the pixels to be generated, starting with the first pixel on the scanline and working towards the last one.

Some codes in a code block require additional data. This additional data is stored in the data block, in the same order as the corresponding codes appear in the code block for the same scanline.

Compression Codes Used in the First Embodiment

Given the properties of PDL-generated images (larger areas of constant color without noise), a 2-dimensional run length encoding will compress many PDL-generated images well. However pages containing sampled images (e.g. photo's) generally have many different colors and many pixels have a color that is not equal to their previously processed neighbor pixels so run length encoding will not perform well. Additional codes are necessary for such situations. The present invention provides a method that performs well in both said situations.

First, a basic 2-dimensional run length compression method with dedicated codes according to the invention will be described.

LEFT Code

We define a code LEFT that indicates that the current pixel has the same color as its left neighbor. We add a run length to this code to indicate that the code should be repeated several times. This is the run length encoding in the first dimension. A code LEFT as the first run on a scanline indicates that the corresponding pixels have the color white.

TOP Code

To make the run-length encoding 2-dimensional, we define a code TOP that indicates that the current pixel has the same color as the pixel above. We add a run length to this code to indicate that the code should be repeated several times. This is the run length encoding in the second dimension. A code TOP on the first scanline indicates that the corresponding pixels have the color white.

Note that this code is very helpful in compressing pages containing sampled images at e.g. half the device resolution. Due to the nearest neighbor interpolation of PostScript/PDF, after scaling to the device resolution, for such an image every second scanline is the same as the scanline above (see FIG. 1). This means that, in this case, every second scanline within such an image can be compressed using a TOP run.

NEW Code

Since we will not be able to use code TOP or LEFT to encode every pixel we will have to add a code that produces a pixel of a new color, which is specified in the compressed data. Code NEW indicates that the current pixel has a color specified as an uncompressed color value in the data block in the order C, M, Y, K, with the high order nibbles first. For each of the four color channels, value 0 corresponds to no ink coverage and value 255 corresponds to full ink coverage.

In order to reduce the worst-case expansion of the compressed format (to allow a simple hardware decompressor), we add a run length to this code to indicate that the code should be repeated several times.

Adding the Run Length

As mentioned, each of the codes LEFT, TOP and NEW above has a run length added. The distribution of the probabilities of the run length values is roughly negative-exponential.

A simple way of adding a run length would be to add an extra nibble that specifies the run length. However that would mean that each code would become 2 nibbles long (the first for the code and the second for the run length). It would also mean that there is considerable redundancy in the code since e.g. a code TOP with run length 1 followed by a code TOP of run length 1 would have the same meaning as a code TOP with run length 2.

In order to prevent these problems we interpret successive occurrences of the same code as one run. In each of the code values for codes LEFT, TOP and NEW, we reserve 1 bit for the run length, to be referred to as L.

Several successive codes LEFT, TOP or NEW are interpreted together by concatenating the run length bits in each of the codes to form a binary number. An offset value that depends on the number of successive codes is added to the number to form the actual run length value.

The result is that with a single code nibble we can specify a TOP, LEFT or NEW run of length 1 or 2. With 2 nibbles we can specify a run of length 3, 4, 5 or 6, etc. Table 1 below shows the interpretation of the concatenated run length bits.

TABLE 1

Interpretation of concatenated run length bits

| Nr of nibbles | Value of concatenated L bits | Resulting length |
| --- | --- | --- |
| 1 | 0-1 | 1-2 |
| 2 | 00-11 | 3-6 |
| 3 | 000-111 | 7-14 |
| 4 | 0000-1111 | 15-30 |
| 5 | 00000-11111 | 31-62 |
| 6 | 000000-111111 | 63-126 |
| 7 | 0000000-1111111 | 127-254 |
| 8 | 00000000-11111111 | 255-510 |
| 9 | 000000000-111111111 | 511-1022 |
| 10 | 0000000000-1111111111 | 1023-2046 |
| 11 | 00000000000-11111111111 | 2047-4094 |
| 12 | 000000000000-111111111111 | 4095-8190 |
| 13 | 0000000000000-1111111111111 | 8191-16382 |
| 14 | 00000000000000-11111111111111 | 16383-32766 |
| 15 | 000000000000000-111111111111111 | 32767-65534 |
| 16 | 0000000000000000-1111111111111111 | 65535-131070 |

Figure 3:
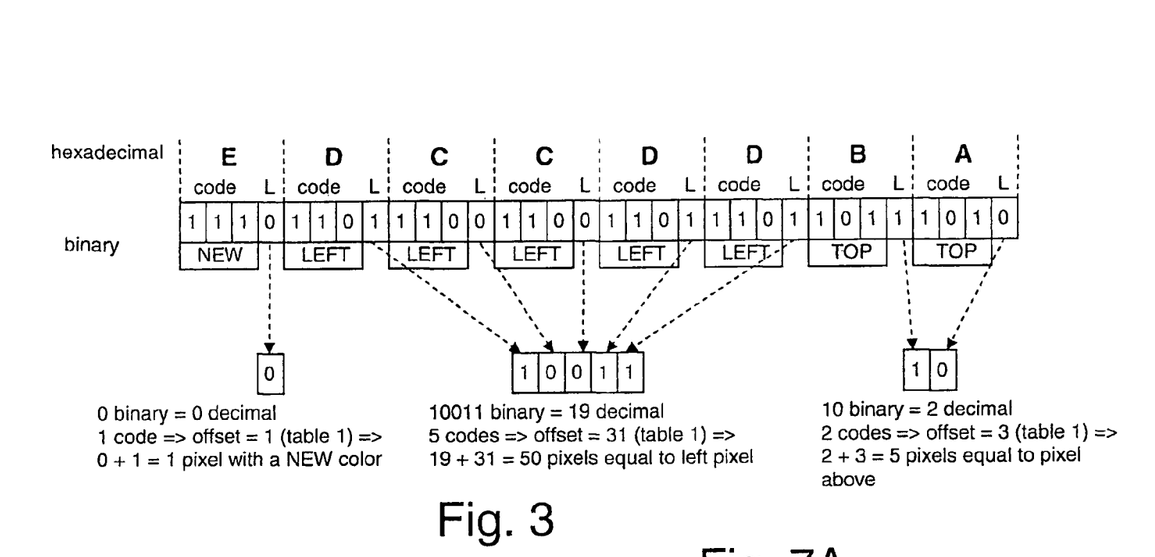
FIG. 3 illustrates an example of the interpretation of run-length fields in run-length codes according to the invention.

In FIG. 3, an example is shown of how a sequence of NEW, LEFT and TOP codes and their run lengths is interpreted. As an example we decode the hexadecimal string EDCCDDBA.

Next, non-runlength codes are described that may be used in addition to the TOP, LEFT and NEW codes described above.

PREV Code

In order to allow efficient compression of full-resolution binary sampled images on the page, code PREV is added which produces one pixel with the PREV color as defined below.

Initially for each scanline the PREV color is set to K-black (C=0, M=0, Y=0, K=255).

Every time the LEFT color changes to a different color, the PREV color is set to the old value of the LEFT color.

Figure 4:
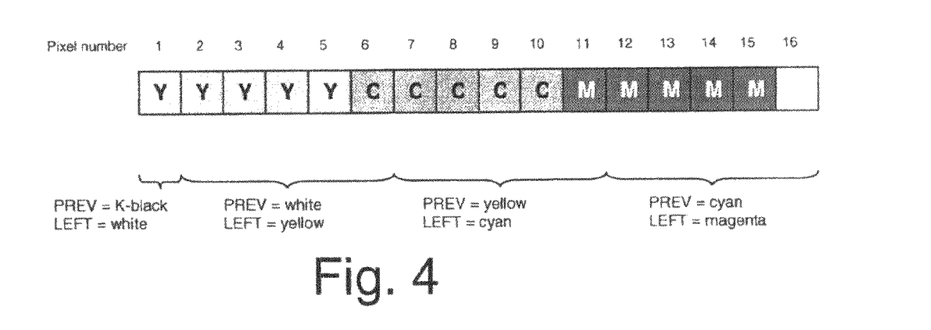
FIG. 4 illustrates an explanation of PREV and LEFT colors in a scan line of pixels.

FIG. 4 shows an exemplary scanline of which the first 5 pixels have color yellow, the second 5 pixels have color cyan and the third 5 pixels have color magenta. Then at the first pixel, the PREV color is K-black and the LEFT color is white. At the second up to the $6^{th}$ pixel, the PREV color is white and the left color is yellow. At the $7^{th}$ pixel up to the $11^{th}$ pixel, the PREV color is yellow and the LEFT color is cyan. At the $12^{th}$ up to the $16^{th}$ pixel, the PREV color is cyan and the left color is magenta.

If the color on a scanline alternates between 2 colors (e.g. black and white) the PREV code can be used to specify the color for every color transition on the scanline. This code produces 1 pixel so no run length is needed.

TOPL, TOPR Codes

Code TOPL specifies that the current pixel has the same color as its neighbor to the northwest. Code TOPR specifies that the current pixel has the same color as its neighbor to the northeast. These codes produce 1 pixel so no run-length is needed.

Table 2 below shows the codes we have defined up to now. The numbering is arbitrary and reflects the final numbering of the codes. Codes 1 to 7 ("0 0 0 1" to "0 1 1 1") are still available.

TABLE 2

Codes defined for 2 dimensional run length encoding

| Code | Name | Description |
|------|------|-------------|
| 0 0 0 0 | PREV | Previous color on this scanline, 1 pixel |
| 1 0 0 0 | TOPL | Color of pixel to the north-west, 1 pixel |
| 1 0 0 1 | TOPR | Color of pixel to the north-east, 1 pixel |
| 1 0 1 L | TOP | Top color (N pixels) |
| 1 1 0 L | LEFT | Left color (N pixels) |
| 1 1 1 L | NEW | New color value (N pixels) |

Additional Codes for Compressing Color Values

The codes that have been defined up to now allow for compression of most simple pages. However pages containing sampled images (e.g. photographs) contain many pixels with a color that is not equal to their previously processed neighbor pixels. Therefore, they would be represented using a NEW code, which causes expansion instead of compression. Since successive color values in a sampled image are often similar, there is a possibility for compression of those color values.

A method according to the present invention for compression of highly correlated color values will now be explained with reference to FIG. 6.

The basic strategy consists of the following steps:
1. Predict the value based on previous values;
2. Determine the difference between predicted value and actual value; and
3. Encode the difference using short codes for commonly occurring (small difference) values and longer ones for less commonly occurring values.

Various lossless image compression algorithms (like JPEG lossless, JPEG-LS etc.) use a similar strategy. The differences are mostly in the construction of the predictor and in the encoding of the difference values.

Since each page that will be printed has to go through the compressor, compression time must be low. This implies that we have to use a simple predictor and simple encoding of difference values that can be implemented efficiently on a general-purpose processor.

Since the gray value of a pixel under consideration is encoded in relation to pixel values in the neighborhood, not only the value of the current pixel is accessed (step S1 in FIG. 6), but also those of predetermined neighboring pixels that have already been processed before (these pixel values will also be available in the decompressing step). Those neighboring pixel values are used to prepare a predicted pixel value in the prediction step.

Figure 6:
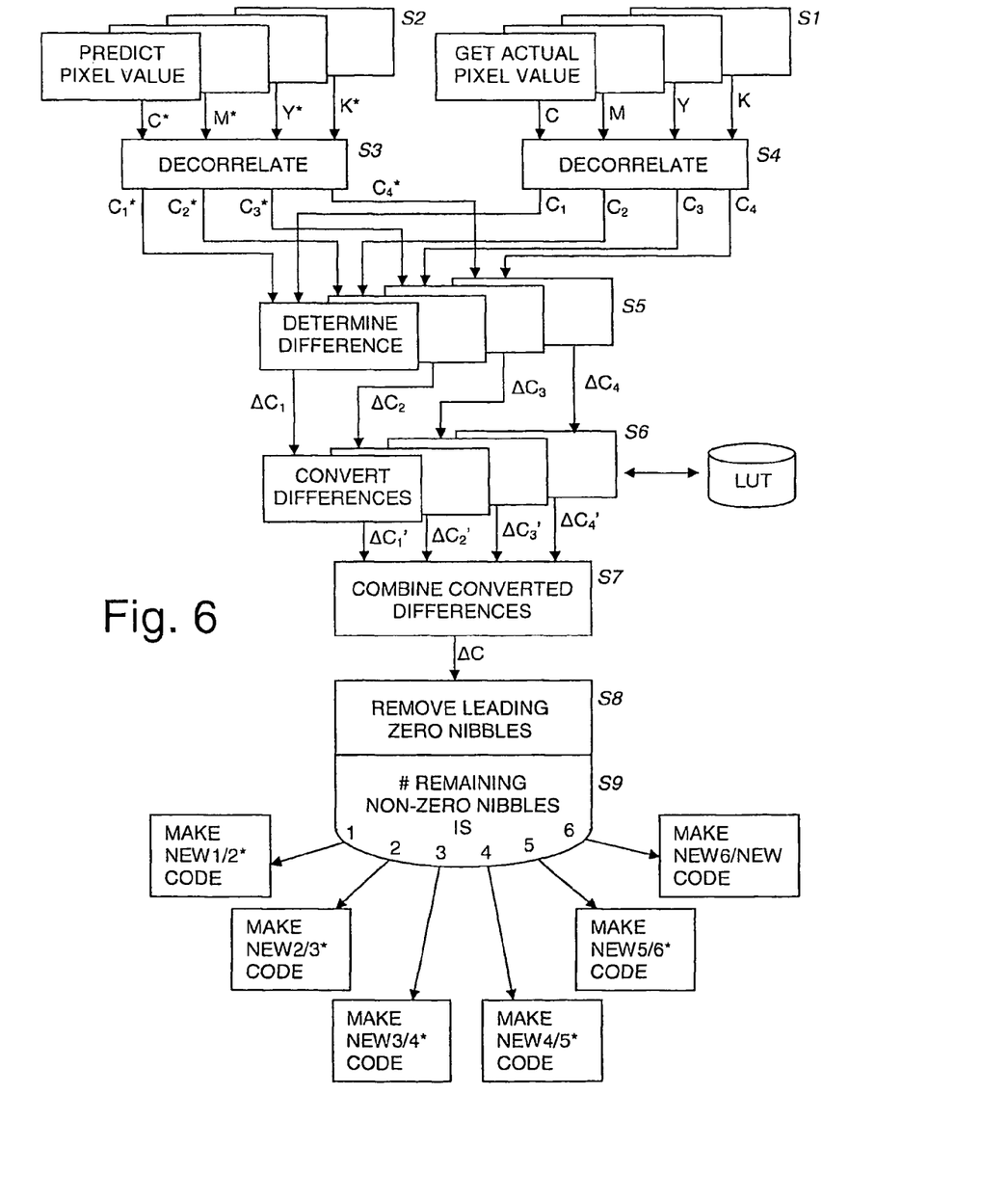
FIG. 6 is a flow chart describing the compression method for color values according to a first embodiment of the invention.

The Prediction Step (FIG. 6: S2)

Figure 5:
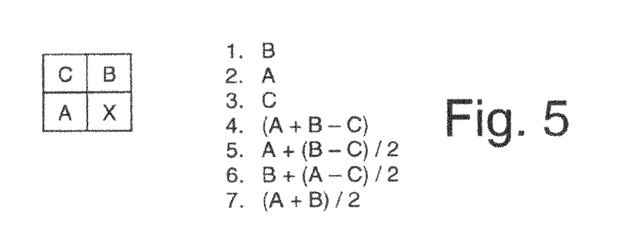
FIG. 5 illustrates examples of predictors.

Various ways have been proposed in literature to predict the value of a pixel X, based on previously decoded pixels values north, west and northwest of pixel X. In FIG. 5, the predictors used in JPEG lossless are shown. Other algorithms use more complex (non-linear) predictors (e.g. JPEG-LS) or adaptive predictors that are modified while the image is being compressed.

Since we need a fast algorithm, in the present embodiment we use a simple predictor: the color of the pixel to the left of pixel X (or white if X is the first pixel on the scanline). More advanced predictors may also be chosen. The choice should be made depending on the situation, since generally, such predictors will increase the compression factor, but execution time of the compressor will also increase.

The Step of Determining the Color Difference

Most lossless compression algorithms are defined for gray scale images and the difference is the difference in gray level between predicted value and actual pixel value. In order to compress color images, the algorithm is applied to each color channel separately. A disadvantage of such an approach is that compression is not optimal since the color channels are generally strongly correlated.

In the encoding method according to the present invention we work with all color channel values together. Basically, in case of CMYK images we will determine 4 color difference values and combine them into one single color difference value. Note that for compression of images with N color channels we would determine N color channel difference values and combine those into a single color difference value.

At low ink coverage values, the K channel is often 0 for many CMYK printers. In order to make optimal use of this, we have defined 2 modes for specifying color difference values: a CMY mode and a CMYK mode.

In CMYK mode we determine color differences over all 4 color channels.

CMY mode can be used when the K channel value does not change. In CMY mode we determine color differences over 3 channels (K is the same as the predicted K value).

De-correlation (FIG. 6: S3, S4)

Since the values of the color channels are generally correlated, we will not determine the color difference values of the original channel values but we will first transform these as follows:

In CMYK mode:

$C1 = M$ $C2 = (K-M+128) \bmod 256$ $C3 = (C-M+128) \bmod 256$ $C4 = (Y-M+128) \bmod 256$ In CMY mode:

$C1 = M$ $C2 = (Y-M+128) \bmod 256$ $C3 = (C-M+128) \bmod 256$

This de-correlation step improves compression without a large performance penalty. Other transformations are also possible for de-correlation to the color channels.

Determination of Differences

The de-correlation step S3 is applied to the predicted color value C*, M*, Y*, K* and delivers de-correlated predicted values C1*, C2*, C3* and C4*. Likewise, a de-correlation step S4 is applied to the actual color value C, M, Y, and K of the pixel to be compressed and delivers de-correlated predicted values C1, C2, C3 and C4.

Then, the difference values $\Delta C1$, $\Delta C2$, $\Delta C3$ and $\Delta C4$ are determined between the resulting de-correlated color values. As will be understood, in the CMY mode only three difference values $\Delta C1$, $\Delta C2$ and $\Delta C3$ are determined.

The Step of Encoding the Color Difference

The goal is to encode the channel differences $\Delta C1$, $\Delta C2$, $\Delta C3$ (and $\Delta C4$) of the de-correlated color values into a single combined number $\Delta C$ (in CMY mode 24 bits and in CMYK mode 32 bits) that is typically small. This number can then be encoded efficiently by dropping the leading 0 nibbles off the number.

Conversion of Difference Values (FIG. 6: S6)

We start by converting each of the channel difference values $\Delta C1$, $\Delta C2$, $\Delta C3$ and $\Delta C4$ to respective byte values $\Delta C1'$, $\Delta C2'$, $\Delta C3'$ and $\Delta C4'$ that can represent any possible color difference value and that is a small value for a small color difference.

The difference values per channel can be positive or negative. In order to combine the values into a single color difference value, we map these values onto a positive value, which is small when the absolute value of the difference is small. This can be done by mapping difference values 0, 1, −1, 2, −2, etc. to values 0, 1, 2, 3, 4, 5, etc. in such a way that impossible difference values are skipped. E.g. when the value of the one of the de-correlated predictor channels $C1^*$, $C2^*$, $C3^*$ and $C4^*$ is 2, negative difference values $\Delta C1$, $\Delta C2$, $\Delta C3$ and $\Delta C4$ below −2 and positive difference values above 253 are not mapped since they cannot occur (all color channel values are within the range 0 to 255).

This mapping can be done using the following formula:

Let P be the byte value of a color channel of the de-correlated predictor and let A be the byte value of the corresponding color channel of the de-correlated actual color channel. Then the following C-language expression performs the mapping described above:

$$(A=P?0:(P<128?$$

$$(A>2*P?A:(A>P?2*(A-P)-1:2*(P-A))):$$

$$(A<=2*P-255?255-A:(A>P?2*(A-P)-1:2*(P-A)))))$$

In the actual compressor software these values are pre-calculated and stored in a 256 by 256 byte lookup table.

Alternatively, a mapping that maps difference values 0, −1, 1, −2, 2 etc. to values 0, 1, 2, 3, 4, 5 etc. may be used. Other similar mappings are also possible, e.g. a mapping based on statistics gathered from actual documents and stored in the 256 by 256 lookup table.

When it comes to decoding, the decompressor can reverse this transformation as follows.

Let P be the byte value of a color channel of the de-correlated predictor and let C be the converted color difference value, then the following C-Language function can be used to determine the color channel value of the de-correlated actual color channel value:

```
unsigned char color(unsigned char P, unsigned char C)
{int M0 = (C&1) ?−1:0;      //wiring
int M7 = (P&128)?−1:0;      //wiring
int C0 = M0 ^ (C>>1);       //xor
int P7 = (M7 ^ P)<<1;       //xor
int C7 = M7 ^ C;            //xor
int PP = P7 − C;            //adder
int PC = P − C0;            //adder
int res = (PP&256) ? C7:PC; //mux
return res;
}
```

This function reflects the way the conversion can be implemented in hardware.

By applying the conversion to the differences ($\Delta C1$, $\Delta C2$, $\Delta C3$ and $\Delta C4$) for the color channels, we obtain 3 (in CMY mode) or 4 (in CMYK mode) color difference byte values $\Delta C1'$, $\Delta C2'$, $\Delta C3'$ (and $\Delta C4'$) that specify the color differences and that are typically small Combining Color Channels (FIG. 6: S7)

In a next step S7 the converted difference values $\Delta C1'$, $\Delta C2'$, $\Delta C3'$ (and $\Delta C4'$) are combined into a single number $\Delta C$ that is typically small. To do this, bits of the separate values are merged, as shown in FIGS. 7A (CMYK) and 7B (CMY).

Figure 7A:
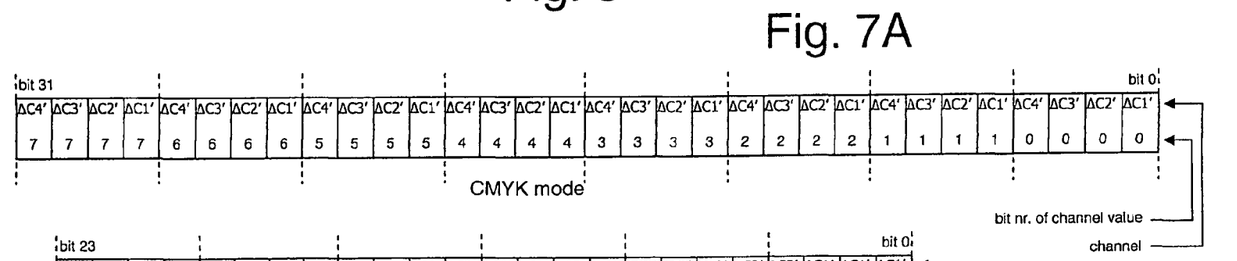
FIGS. 7A and 7B are a schematic representation of the combination of color channel data in the first embodiment.
Figure 7B:
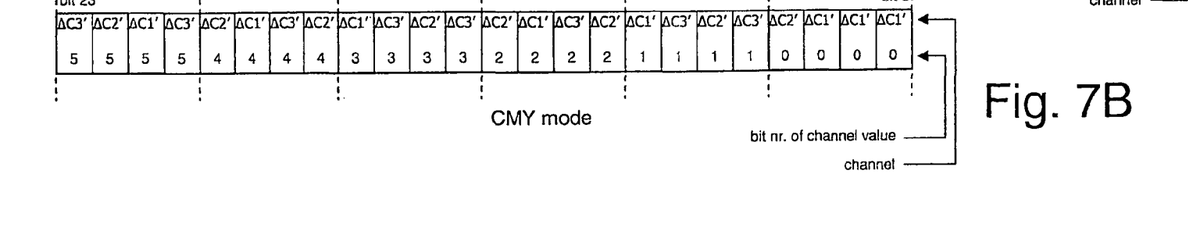

As can be seen in FIG. 7A, in CMYK mode we simply interleave the bits of the 4 color difference values $\Delta C1'$, $\Delta C2'$, $\Delta C3'$ and $\Delta C4'$. In CMY mode (FIG. 7B), we do not simply interleave the bits of each difference value. The reason is that the value of the $\Delta C1'$ channel is typically larger than the values of the other channels. The optimal ordering of the bits was determined experimentally for a set of representative test images. In CMYK mode this may also be done as an alternative to the interleaving.

The result of the merge is a single 24 or 32 bit number $\Delta C$ that represents the color difference and that has a small value for small color differences.

An alternative approach within the scope of the present invention is to use a C-dimensional lookup table with C being the number of color channels. The lookup table is indexed with the C color difference values and each entry in the table contains a unique number such that often occurring color differences have a small value and rarely occurring color differences have a larger value. The table can be filled based on statistics gathered from test images.

Encoding the Difference Value (FIG. 6: S8/S9)

The final step is to encode the number $\Delta C$ in the compressed format efficiently by removing the high order 0 nibbles from $\Delta C$ (S8) and generating codes for the remaining value (S9). In the encoding step S9 one code nibble is generated and stored in the code block (FIG. 2) and an integer number of related data nibbles are generated and stored in the data block.

By using 6 code nibble values to represent a color difference $\Delta C$ using 1, 2, 3, 4, 5 or 6 extra data nibbles, we can encode the color difference values and achieve compression. If, in CMYK mode, the color difference $\Delta C$ cannot be represented using 6 data nibbles then the original code NEW is used to represent the color value uncompressed (using 8 data nibbles for the color value, viz. 2 per color channel).

The 6 new codes will be called NEW1 to NEW6 and will have code value 1 to 6 with NEW1 having 1 data nibble and NEW6 having 6 data nibbles to represent the color difference value $\Delta C$.

The 7$^{th}$ free code nibble is used for a new code NEM6 that does the same as NEW6 but also switches the mode between CMY and CMYK mode.

The Number of Pixels Generated by the New Codes

Each of the NEW1 to NEW6 codes and code NEM6 could generate 1 pixel per code. However most sampled images on pages have a resolution lower than the device resolution.

The PostScript interpreter uses nearest neighbor interpolation to scale up the image. This results in several pixels in a row having the exact same value (see FIG. 1). The compressor could use a LEFT code to compress this but it is more efficient if we allow the NEW1 to NEW6 and NEM6 codes to generate a run of N identical pixels. Initially for each image N is set to 1 implicitly.

This implies that we need to add codes that allow changing N. This will not happen often so we do not need short codes for changing N.

In order to make this possible we make use of the fact that some of the coded color difference values of the above-defined NEW1 to NEW6 codes will not occur.

First Nibble 0 (code NEWi*): N→1

Argument values that will never occur are argument values that have a first nibble that is zero (since we stripped leading zero nibbles off the value before encoding it). We use those argument values to change the meaning of nibble code values 2 to 6 as follows:

If the first nibble of the argument values is zero then codes 2 to 6 will be interpreted as codes NEW2* to NEW6*. These codes have the same meaning as the codes NEW2 to NEW6 except that they always produce only 1 pixel instead of N pixels (current N value), and also set N to 1.
Code INC: N→N+1

Another combination that will never occur is code nibble 1 with a zero argument value, since that implies that the color of the pixel is the same as its neighbor to the west and we used code LEFT to encode that case. We use this combination to define a new code INC that produces 1 pixel with the same color as the left pixel and that increments N by 1.
Code NEW It will not always be possible for the compressor to use one of the NEW1* to NEW6* codes to reset N to 1 if the color cannot be expressed with only 6 nibbles. Therefore a code NEW with more than 1 new color values (i.e., L>1) will also set N to 1.

Table 3 below shows all code nibbles and their interpretation:

TABLE 3

Summary of the code nibbles and their interpretation

| Code | Name | Data nibbles | Description |
|---|---|---|---|
| 0 0 0 0 | PREV | none | Previous color on scanline, 1 pixel |
| 0 0 0 1 | NEW1 | 1, non-zero | New color value, run of N pixels |
| | INC | 1, zero | Left color, 1 pixel, N = N + 1 |
| 0 0 1 0 | NEW2 | 2, $1^{st}$ non-zero | New color value, run of N pixels |
| | NEW2* | 2, $1^{st}$ zero | New color value, 1 pixel, N = 1 |
| 0 0 1 1 | NEW3 | 3, $1^{st}$ non-zero | New color value, run of N pixels |
| | NEW3* | 3, $1^{st}$ zero | New color value, 1 pixel, N = 1 |
| 0 1 0 0 | NEW4 | 4, $1^{st}$ non-zero | New color value, run of N pixels |
| | NEW4* | 4, $1^{st}$ zero | New color value, 1 pixel, N = 1 |
| 0 1 0 1 | NEW5 | 5, $1^{st}$ non-zero | New color value, run of N pixels |
| | NEW5* | 5, $1^{st}$ zero | New color value, 1 pixel, N = 1 |
| 0 1 1 0 | NEW6 | 6, $1^{st}$ non-zero | New color value, run of N pixels |
| | NEW6* | 6, $1^{st}$ zero | New color value, 1 pixel, N = 1 |
| 0 1 1 1 | NEM6 | 6 | New color value, run of N pixels + mode change (CMY <-> CMYK) |
| 1 0 0 0 | TOPL | none | Color of pixel north-west, 1 pixel |
| 1 0 0 1 | TOPR | none | Color of pixel north-east, 1 pixel |
| 1 0 1 L | TOP | none | Top color. See table 1 for interpretation of L bits |
| 1 1 0 L | LEFT | none | Left color. See table 1 for interpretation of L bits |
| 1 1 1 L | NEW | number of new colors * 8 | New colors. See table 1 for interpretation of L bits |

Compression Method According to the Invention

Figure 8:
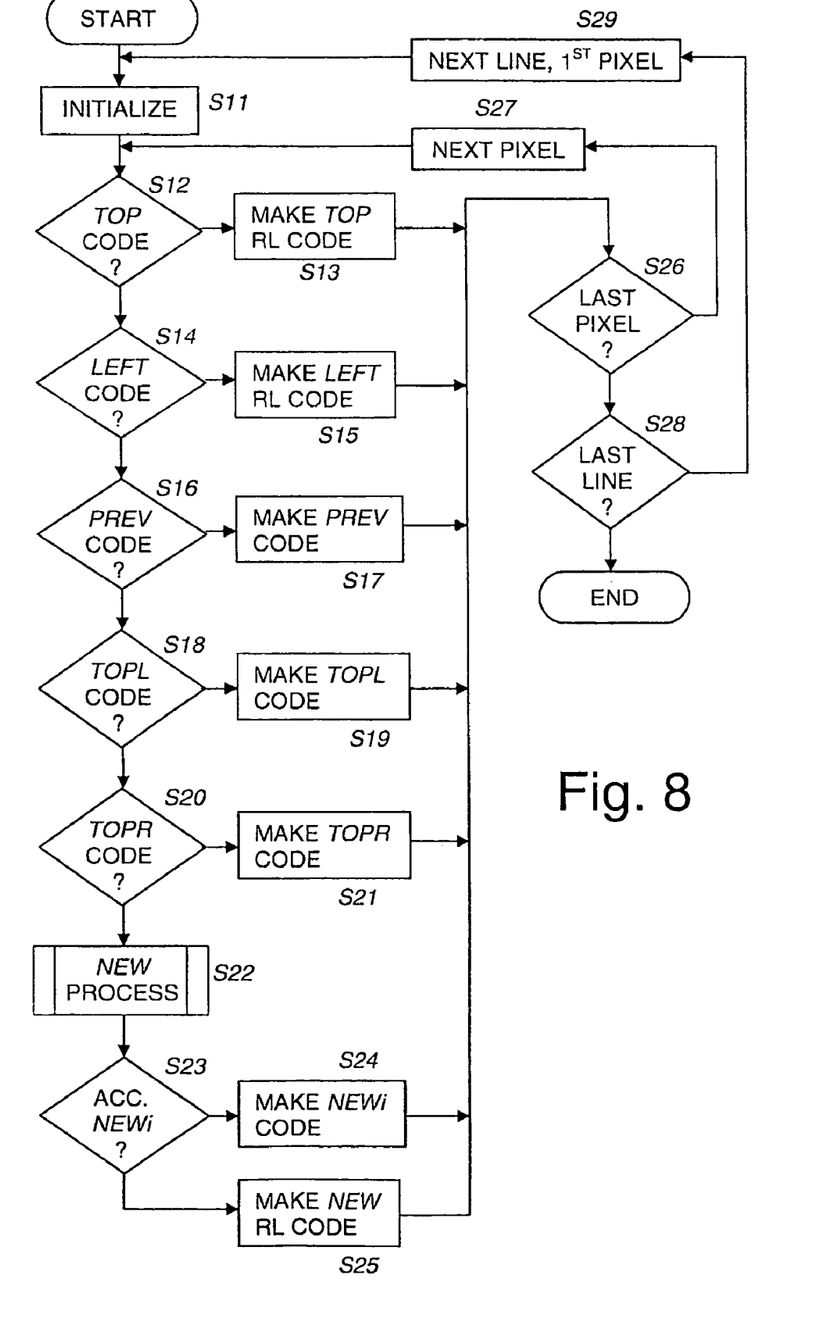
FIG. 8 is a flow chart describing the complete compression method according to a first embodiment of the invention.

Now that the compressed image format has been defined we will explain the method that an exemplary compressor according to the present invention may use to produce this format. Reference is made to FIG. 8.
Pixel Processing Order The exemplary compressor processes the image scanline by scanline starting at the first scanline of the image and continuing until all scanlines have been processed (steps S26 to S29). For each scanline the compressor processes all pixel starting at the left-most pixel on the scanline, until all pixels on the scanline have been processed. Upon the start of a new scanline, the PREV and LEFT pixels are set to "white" in an initializing step S11.
Steps for Each Pixel The compressor attempts to compress every next pixel by trying to apply different codes for compressing the pixel in the following fixed order:

1) The pixel is compared to the TOP color (S12). This is the color of the neighbor pixel to the north or, if the current pixel is on the first scanline, the color white. If a match is found, then the compressor generates a TOP run by generating one or more TOP codes and maximizes the length of this run by adding to this run all following pixels that can be encoded with a TOP run (S13). Then the process restarts at step 1 with the next uncompressed pixel (S26, S27).

2) If the preceding step did not allow encoding the pixel, then the pixel is compared to the LEFT color (S14). This is the color of the neighbor pixel to the west or, if the current pixel is at the start of a scanline, the color white. If a match is found, then the compressor generates a LEFT run by generating one or more LEFT codes and maximizes the length of this run by adding to this run all following pixels that can be encoded with a LEFT run (S15). Then the process restarts at step 1 with the next uncompressed pixel (S26, S27).

3) If the preceding step did not allow encoding the pixel, then the pixel is compared to the PREV color (S16). The value of the PREV color has been explained hereinbefore. If a match is found, then the compressor generates a PREV code (S17). Then the process restarts at step 1 with the next uncompressed pixel (S26, S27).

4) If the preceding step did not allow encoding the pixel, then the pixel is compared to the TOPL color (S18). This is the color of the neighbor pixel to the northwest or, if it doesn't exist, the color white. If a match is found, then the compressor generates a TOPL code (S19). Then the process restarts at step 1 with the next uncompressed pixel (S26, S27).

5) If the preceding step did not allow encoding the pixel, then the pixel is compared to the TOPR color (S20). This is the color of the neighbor pixel to the northeast or, if it doesn't exist, the color white. If a match is found, then the compressor generates a TOPR code (S21). Then the process restarts at step 1 with the next uncompressed pixel (S26, S27).

6) If the preceding step did not allow encoding the pixel, then the method for compressing color values described hereinbefore in the "Additional codes for compressing color values" section is applied (S22). If the K channel value is the same as the predicted K channel value then CMY mode is used to compress the color, otherwise CMYK mode is used. It is then checked (S23) if that results in an acceptable NEWi code, that is, a color difference value of 6 nibbles or less with no mode change. If so, then the appropriate one of the NEW1 to NEW6 codes is generated together with the color difference nibbles (S24). If that is not the case then a code NEW is generated and the new color value is written uncompressed to the data block (S25).

If the previous mode was different from the mode used to compress the pixel and if the length of the color difference value is 6 nibbles or less then code NEM6 is generated together with the color difference nibbles. If the color difference value is longer than 6 nibbles then a code NEW is generated and the new color value is written uncompressed to the data block. These steps are not explicitly shown in FIG. 8, but are considered to form part of the steps S24 and S25.

If the value of N is larger than the number of successive pixels with that color and the color difference value has a length of 5 nibbles or less, then the appropriate one of the NEW2* to NEW6* codes is generated together with the color difference nibbles preceded by a null nibble. If that is not possible then a code NEW is generated for the current pixel and the next pixel and the color values of the current and next pixels are written uncompressed to the data block. These steps are not explicitly shown in FIG. 8, but are considered to form part of the steps S24 and S25.

Then the process restarts at step S11 with the next uncompressed pixel (S26, S27).

A code NEW with a run length of at least 2 causes N to be reset to 1.

In order for the compressor to increment N when appropriate, every time a LEFT run follows a code in the range 1 to 6 (indicating a new color), the compressor stores its state (unless a state was already stored less than 32 pixels ago). From that point on it keeps track of the minimum number M of successive pixels with the identical colors on the scanline.

If the compressor determines that incrementing N would allow for better compression, then the compressor restores its state to the state it previously stored (thereby discarding any output it generated after storing that state) and N is incremented to the value of M by generating one or more INC codes. Then compression restarts at the point indicated by the stored state.

Examples of Possible Simplifications Within the Scope of the Present Invention

Compression steps 3, 4 and 5 could be done in a different order without significant loss of compression.

Compression steps 3, 4 and 5 could be left out of the compressor without significant loss of compression for most images. Then the corresponding codes PREV, TOPL and TOPR could be removed from the compressed format.

Compression steps 1 and 2 can be exchanged without significant change in compression.

Instead of having a CMYK and a CMY mode, a CMYK mode only would work, albeit with some loss of compression. With one mode, code NEM6 could be removed from the compressed format.

N could have been fixed to 1, albeit with some loss of compression. Then the codes INC and NEW2* to NEW5* could be removed from the compressed format.

Code NEW has a run length to reduce the maximum expansion of the compressed format. If there would be no requirements for the maximum expansion, a run length would not be needed for code NEW.

Decompression Method According to the Invention

For each successive scanline, starting at the first scanline of the image and proceeding to the last scanline, the de-compressor processes the code nibbles from the code block and takes the corresponding data nibbles from the data block. It assigns the decompressed color values to the successive pixels on that scanline, starting at the left-most pixel.

Each pixel is assigned a color exactly once.

When the decompressor encounters a code PREV it assigns the PREV color (of which it keeps track) to the current pixel. The value of the PREV color is explained hereinabove.

When the decompressor encounters one of the code values 1 (hexadecimal 0 0 0 1) to 6 (hexadecimal 0 1 1 0), it checks the value of the next data nibble in the data block.

If the data nibble is non-zero, the code is interpreted as one of the codes NEW1 to NEW6. In that case the de-compressor reconstructs the color value of the next pixel from the color value of the predictor in combination with the difference value store in the data block according to the current mode, by reversing the transformation steps applied by the compressor. This color value is then assigned to N successive pixels starting at the current one.

The color value of the predictor is the color of the previously decompressed pixel on the scanline, or white if the current pixel is the first on the scanline.

If the data nibble was zero and the code value was greater than 1, then the code is interpreted as one of the codes NEW2* to NEW6*. In that case the de-compressor reconstructs the color value from the color value of the predictor in combination with the difference value store in the data block according to the current mode, by reversing the transformation steps applied by the compressor. This color value is then assigned to the current pixel. Additionally the de-compressor sets N to 1.

If the data nibble was zero and the code value is 1, then the code is interpreted as code INC. In that case the de-compressor assigns the color of the previously decompressed pixel (or the color white if the current pixel is the first on the scanline) to the current pixel. Additionally it increments N by 1.

When the decompressor encounters a code NEM6 (code value 0 1 1 1), it switches the current mode and it reconstructs the color value from the color value of the predictor in combination with the difference value store in the data block according to the current mode, by reversing the transformation steps applied by the compressor. This color value is then assigned to N successive pixels starting at the current one.

When the decompressor encounters a code TOPL (code value 1 0 0 0), it copies the color from the previously decompressed neighbor pixel to the northwest and assigns it to the current pixel. If there is no such neighbor pixel it assigns the color white to the current pixel.

When the decompressor encounters a code TOPR (code value 1 0 0 1), it copies the color from the previously decompressed neighbor pixel to the northeast and assigns it to the current pixel. If there is no such neighbor pixel it assigns the color white to the current pixel.

When the decompressor encounters a code TOP (code value 1 0 1 L), it collects all immediately following TOP codes from the code block and determines the run length R using the method described above. Then R pixels, starting from the current pixel are each assigned the color from their neighbor pixel to the north. If the decompressor is decompressing on the first scanline then all R pixels are assigned the color white.

When the decompressor encounters a code LEFT (code value 1 1 0 L), it collects all immediately following LEFT codes from the code block and determines the run length R using the method described above. Then R pixels, starting from the current pixel are assigned the color from their neighbor pixel to the left. If the current pixel is the first pixel on a scanline then all R pixels are assigned the color white.

When the decompressor encounters a code NEW (code value 1 1 1 L), it collects all immediately following NEW codes from the code block and determines the run length R using the method described above. Then the decompressor takes R uncompressed color values from the data block and assigns them to the following R pixels, starting at the current pixel. If the run length R is greater than 1 then the decompressor sets N to 1.

Evaluation of the Compression Method

In order to evaluate the performance of the compression method, we used the compressor to compress a range of images and compared the results (compression time and compression factor) with results from compressing the same images with JPEG-LS. We also compared the compression time with the time it took an Adobe PostScript interpreter to generate the pages.

All tests were done on a 2.4 GHz Pentium 4. The PostScript test files were run on the Adobe PostScript interpreter and the resulting 600 dpi continuous tone CMYK bitmaps were compressed. The size of the bitmaps was A4 (4958 by 7040 pixels) resulting in an uncompressed size of 136345 Kbytes. On the PostScript interpreter, the interpretation of DeviceRGB was set to sRGB and the interpretation of DeviceCMYK was set to Euroscale. A Euroscale output profile was used.

The PostScript test files used contain complex but realistic page descriptions. A specially constructed PostScript file (chrisA4.ps) has been included which contains an extremely complex page with lots of very fine details (a photo-mosaic page, containing a page-size image consisting of many very small images). This is not a very realistic page but it is used to explore the boundaries of compressibility.

In order to compare the compression performance of the new compressor with the state of the art in lossless image compression, we compared our results with those produced by JPEG-LS.

JPEG-LS is based on HP's LOCO-I algorithm and has been selected by the ISO/ITU-T as a standard for lossless compression of continuous tone images. A description of the algorithm is given in: M. Weinberger, G. Seroussi, G. Saipiro, LOCO-I: A Low Complexity, Context-Based, Lossless Image Compression Algorithm", available on www.hpl.hp-.com/loco/HPL-98-193R1.pdf.

Compared to other lossless continuous tone image compression algorithms (lossless JPEG, CALIC, FELICS), JPEG-LS is relatively simple and fast and it produces better compression. Compression performance for JPEG-LS is slightly better than for JPEG2000 lossless (see Diego Santa Cruz, Touradj Ebrahimi, "An analytical study of JPEG 2000 functionalities", available on www.jpeg.org/public/wgln1815.pdf).

We have chosen the JPEG-LS plug-in for Adobe photoshop to test JPEG-LS. It is an efficient implementation that reports the compression time required for the page. It is available on http://www.hpl.hp.com/loco. Note that JPEG-LS has been designed as a generic lossless continuous tone image compression technique, not specifically for the compression of PDL generated continuous tone images.

The detailed measurement results are presented in Table 4 below.

TABLE 4

Measurement results

| Document | PS-RIP Time (sec) | Our compression Time (sec) | Our compression Size (kbyte) | JPEG-LS Time (sec) | JPEG-LS Size (kbyte) |
|---|---|---|---|---|---|
| breakfast.ps | 3.51 | 0.61 | 17712 | 11.69 | 28233 |
| chqf.ps | 1.18 | 0.19 | 3711 | 5.01 | 6678 |
| chrisA4.ps | 8.79 | 2.22 | 80413 | 17.42 | 67916 |
| gatf1.ps | 1.69 | 0.13 | 1002 | 4.35 | 4118 |
| gatf2.ps | 1.34 | 0.31 | 6802 | 6.47 | 15657 |
| gatf3.ps | 1.09 | 0.34 | 7284 | 6.77 | 14979 |
| gatf4.ps | 0.94 | 0.27 | 6283 | 6.31 | 13713 |
| oilplatform.ps | 3.70 | 0.63 | 17857 | 11.05 | 25637 |
| model-puzzle.ps | 6.70 | 1.44 | 43832 | 11.12 | 35080 |
| printwork1.ps | 1.89 | 0.11 | 434 | 2.82 | 1870 |
| printwork2.ps | 2.80 | 0.09 | 122 | 4.40 | 1123 |
| printwork4.ps | 3.27 | 0.56 | 17317 | 7.46 | 18944 |
| printwork5.ps | 3.59 | 0.98 | 31423 | 10.85 | 32585 |
| printwork6.ps | 1.97 | 0.58 | 19396 | 8.00 | 21758 |
| Average: | 3.03 | 0.60 | 18113 | 8.12 | 20592 |

The first column lists the names of the test pages. The names have no special meaning other than that they happen to be the names under which the documents were stored. The second column shows the execution time of a state of the art Adobe PostScript interpreter for converting the PostScript description of the page into the image to be compressed. The third column shows the execution time of the new compression method and the fourth column shows the resulting amount of compressed data. The fifth column shows the execution time of the JPEG-LS compressor and the sixth column shows the resulting amount of compressed data. The last line of the table shows the averages over all test images.

The average compression time for the new method is 0.6 seconds, which is about 20% of the execution time of the PostScript interpreter for generating the page. The average compression time of JPEG-LS is 8.12 seconds, which is about 13.5 times slower than the new compression method. It is also clear from these results that JPEG-LS does not fulfill our requirements since it is much too slow in comparison to the PDL interpretation time.

The amount of compressed data produced by the new compression is on the average less than the amount produced by JPEG-LS. For some very complex pages containing samples images at a resolution equal to the device resolution ("chrisA4.ps" and "model-puzzle.ps") JPEG-LS produces less compressed data than the new method, but such pages are rare in practice.

Implementation in Hardware

The compressed format has several properties that allow for simple implementation of the decompressor in hardware.

The maximum local expansion of the format occurs when a NEW code of length 3 is directly followed by a NEW6 or NEM6 code. The NEW code takes 2 code nibbles+3*8 data nibbles. The NEW6 or NEM6 code takes 1 code nibble+6 data nibbles. This means that in total 33 nibbles are needed in this case to produce 4 CMYK pixel values, so the worst case local expansion is $1/32=3.1\%$. This means that the speed at which uncompressed data has to be processed is at most 3.1% higher than the rate at which uncompressed pixels are produced.

The compressed format has been constructed in such a way that each code produces at least one pixel.

The only special case occurs for the codes LEFT, TOP and NEW, which require successive occurrences of the code to be interpreted as a whole. When the first code nibble for one of these codes has been interpreted, the source of the successive color values is clear:

for code LEFT: all the same as the left color;
for code TOP: all coming from the pixel above the target pixel; and
for code NEW: all coming from the compressed data stream.

At that point, transfer of the colors to the new pixels can be started and can proceed in parallel with code interpretation. The code interpreter can proceed to combine successive codes until a different code is encountered. Then it knows how many pixels have to be generated. Since the amount of pixels produced by these codes increases faster than the number of nibbles needed to encode this amount, the code interpreter will always be finished determining the amount of pixels before that amount of new color values has been transferred. So the code interpreter can stop the transfer of color values to new pixels after the correct number of pixels have been produced.

A second embodiment of the present invention, which is a compression method intended for continuous tone black-and-white (grey-value) images, will now be described.

The mechanisms used in the second embodiment are the same as those of the first embodiment described above, namely:

The compression is done on a line-per-line basis. For each line the compressed data is organized in 2 parts, the "data block" and the "code block".

For each pixel or each set of identical pixels, a code or a series of codes are generated in the code block. For some codes (NEWi codes), additional data are necessary which are stored in the data block. At the end of each scanline, the data block and the code block are put together to generate the compressed data for the current line.

The second embodiment uses a reduced set of codes and is bit-oriented (as opposed to the nibble-oriented first embodiment). More particularly, codes are always 3 bits long, but the associated parts in the data block have variable length (number of bits). The codes that are used in the second embodiment are defined as follows.

Code TOP, LEFT, and PREV have the same meaning as in the first embodiment: they encode a run of pixels identical to the pixel to the top, the left or the previous color, respectively.

Code NEW encodes a new color; this code can define a run of identical pixels, although the runlength defining mechanism is different than that of the first embodiment, as will be explained later.

Code NEW1 to NEW4 and NEW3* and NEW4* encode a pixel or a run of identical pixels having a grey value that differs from that of the predicted value (in this example the pixel to the left) by an amount that fits in 1 to 4 bits or 2 or 3 bits, respectively (once converted into a positive integer).

The code words are 3 bits long and can take any of the values listed in Table 5 below.

TABLE 5

Summary of the codes

| Code | Name |
| --- | --- |
| 0 0 0 | NEW1/PREV |
| 0 0 1 | NEW2/NEW |
| 0 1 0 | NEW3/NEW3* |
| 0 1 1 | NEW4/NEW4*/INC |
| 1 0 L | LEFT |
| 1 1 L | TOP |

The definition of the codes is as follows.

LEFT and TOP code: there is no associated data part. Several identical codes are interpreted together and the "L" bit is used to encode the number of corresponding pixels, in much the same way as in the first embodiment.

PREV code: no associated data part. It generates a pixel with the current previous color.

NEW1/NEW2/NEW3/NEW4 codes: when the current pixel to be coded cannot be expressed by a LEFT, TOP, or PREV code, the difference between the color value of the current pixel and the left pixel is computed, and then converted into a positive integer (by the same mechanism as in the first embodiment). If this difference (an 8 bit integer) can fit in 1, 2, 3, or 4 bits after truncation of leading zero bits, a corresponding NEWi code is selected. In addition, an associated data part is formed, that corresponds to the difference and thus is 1, 2, 3, or 4 bits long, respectively. The codes NEW1 to NEW4 produce a run of pixels, of which the length (called N) is maintained during the processing of the document.

INC/NEW3*/NEW4* codes: the current run length value N is set to 1 at the beginning and is increased by 1 with an INC code, which code also produces a pixel of the left color. N can be reset to 1 when the value is too high (i.e., when a set of N pixels would not fit the input data): the NEWi* codes are used therefor, as in the original format.

The decoder will recognize these codes since a NEWi* code has an associated data part beginning with 0 as the MSB (most significant bit).

NEW code: when a new color value cannot be encoded with one of the previous codes, the NEW code is used. The data part of the NEW code contains the new grey value (8 bits), but may also contain run length information as will be explained below. Finally, a succession of at least two NEW codes resets the value of N to 1, in the same way as in the first embodiment.

The codes are differentiated with their data part:

Code 0 0 0: NEW1/PREV

The associated data with this code is 1 bit long. It means that the difference between the current pixel and the one to its left can be expressed with only 1 bit. The case where the data bit is set to 0 is impossible since it would mean no difference between the two pixels. Thus this possibility is used to encode a PREV code.

Code 0 0 1: NEW2/NEW

The associated data with this code is 2 bits long. It means that the difference between the current pixel and the one to its left can be expressed with 2 bits. The case where the MSB (most significant bit) of the data part is 0 is used for the NEW code. In that case, the LSB (least significant bit) of the 2 bit long data part is a run-length bit used to group several NEW codes together, in much the same way as the L bit in the LEFT and TOP codes (although in those codes the L bit is situated in the code itself). In case of several NEW codes grouped together, the 2 bits data parts of all NEW codes are grouped and put in the data block and then, all the NEW color values (8 bits each) are put in the data block.

Note, however, that a code NEW2 following a NEW code could lead to misinterpretation by the decoder, depending on the NEW color value. Therefore, we prevent a code NEW2 from following any NEW code.

Code 0 1 0: NEW3/NEW3*

The associated data part of this code is 3 bits long. This code is used when the difference between the current pixel and the one to its left can be expressed with 3 bits. A NEW3* code is a NEW3 code with a data part having its MSB set to 0. It is used to reset the N value to 1, and encodes a difference with the 2 additional data bits. Since in this embodiment a NEW2* code is not available, the NEW3* is also used for a difference that can be expressed in 1 bit.

Code 0 1 1: NEW4/NEW4*/INC

The associated data part of this code is 4 bits long. This code is used when the difference between the current pixel and the one to its left can be expressed with 4 bits. A NEW4* code is a NEW4 code with a data part having its MSB set to 0. It is used to reset the N value to 1, and encodes a difference with the 3 additional data bits. An INC code is a NEW4 code with a data part equal to 0 (all 4 bits). It is used to increment the N value by 1 and generate a pixel with the same color as the pixel to the left.

Code 1 0 L: LEFT

There is no associated data with this code. It is used when the pixel to encode has the same color as the pixel to its left. The "L" bit is a run-length bit that is used to group several LEFT codes together (same mechanism as in the first embodiment)

Code 1 1 L: TOP

There is no associated data with this code. It is used when the pixel to encode has the same color as the pixel to the top. The "L" bit is a run-length bit that is used to group several TOP codes together (same mechanism as in the first embodiment).

Figure 9:
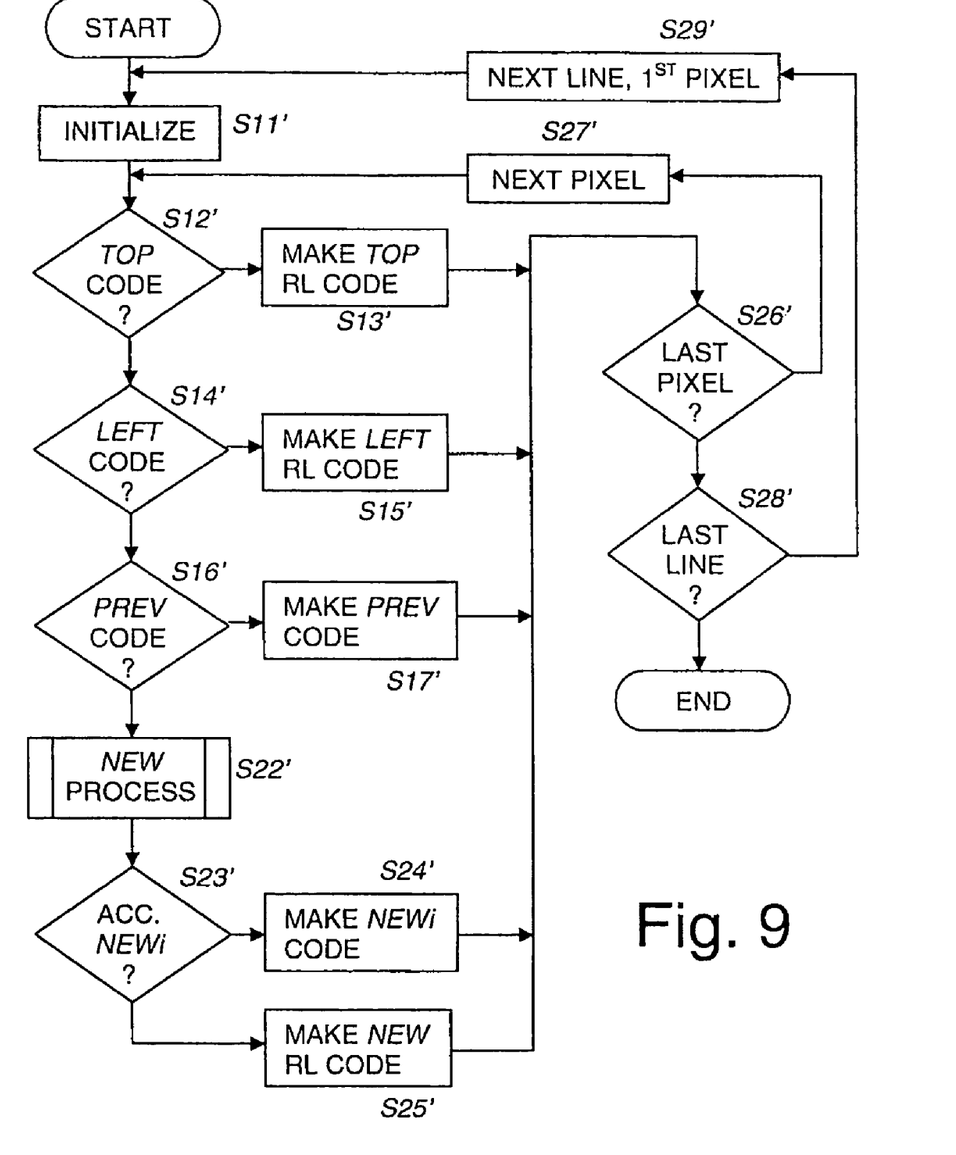
FIG. 9 is a flow chart describing the complete compression method according to a second embodiment of the invention.

FIG. 9 shows a flow chart of the general encoding process according to the second embodiment of the invention. This process is largely similar to that of the first embodiment as described with reference to FIG. 8, although, since less codes are used, some of the steps are missing. A full description of FIG. 9 is therefore omitted here, since it will be easily understood on the basis of the description of the codes hereinabove.

The individual steps of the process have been numbered in accordance with the corresponding steps in FIG. 8. Reference numbers in FIG. 9 have been provided with an accent.

Figure 10:
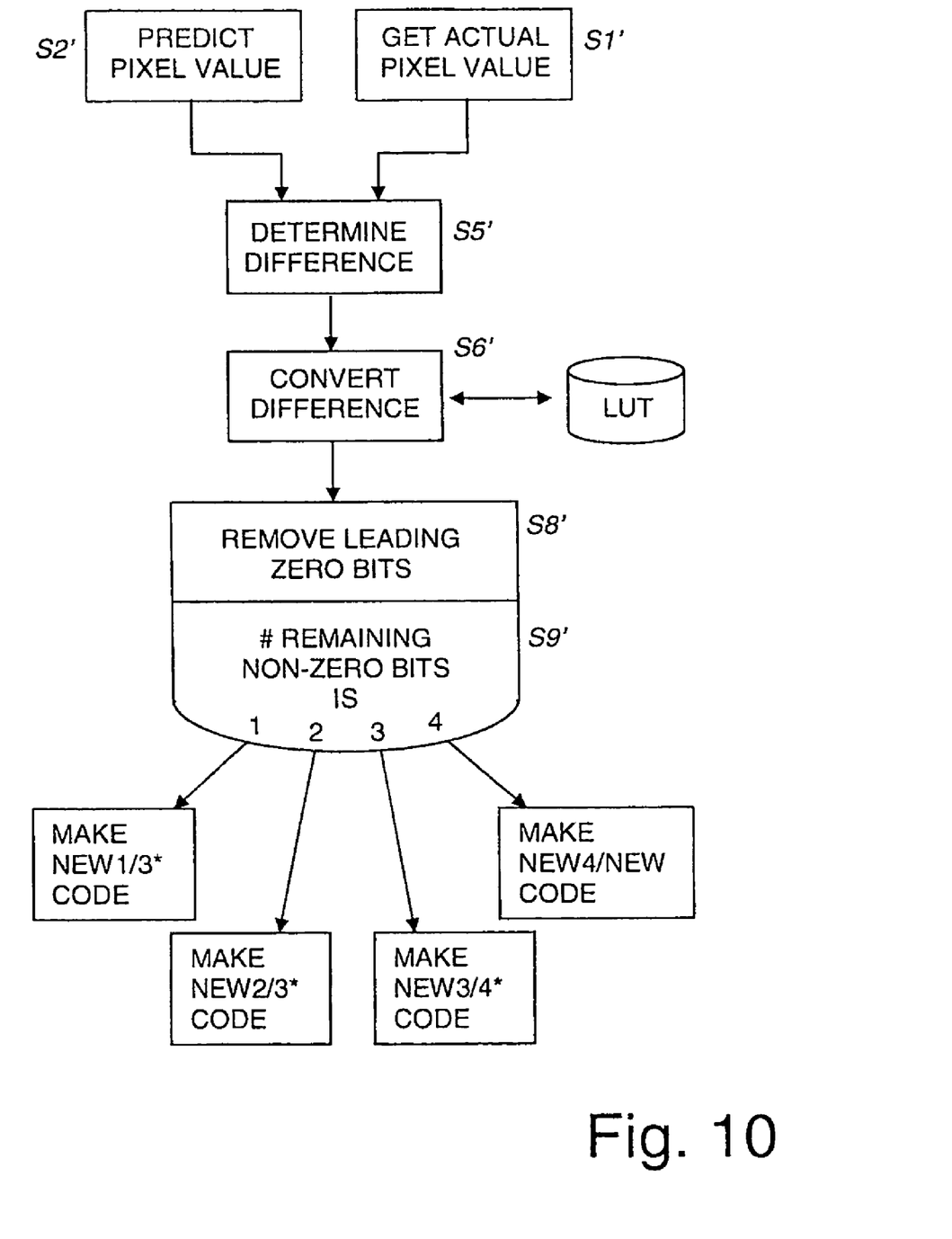
FIG. 10 is a flow chart describing the compression method for gray values according to a second embodiment of the invention.

FIG. 10 describes the basic NEWi code forming process according to the second embodiment, as referred to by reference number S22' in FIG. 9. Since this process operates on one color channel only, several steps of the first embodiment are superfluous. Those steps left have been numbered with corresponding reference numbers as in FIG. 6, provided with an accent, and are listed below. For a detailed explanation for each step, the reader is referred to the description of FIG. 6 and the description of the codes of the second embodiment hereinabove.

The actual value of a pixel under consideration is accessed in step S1' and a predicted value is determined from neighboring pixels (e.g., the pixel to the left) in step S2'. Then, the difference of the actual and predicted values is determined in step S5' and this value is converted in step S6' to a positive integer which is small for small differences and larger for larger differences. The actual conversion may be based on the use of a lookup table (LUT) that may have been filled before with a general or a dedicated conversion data set.

The resulting difference value is then truncated by cutting off leading zero bits (S8') and the remaining non-zero bits are encoded in NEWi codes in step S9', as described hereinabove.

The present invention, of which two embodiments have been described in detail above, provides a new compression method and format for lossless compression and decompression method for (preferably) PDL-generated continuous tone page image data.

Compared to a state of the art lossless image compression algorithm like JPEG-LS, the new method is faster on average, as measured for a representative set of test documents. This allows compression to be implemented on the same computer as used to run the PDL interpreter, without additional hardware and without large performance penalties.

The invention being thus described, it will be obvious that the same may be varied in many ways. Such variations and modifications as would be obvious to one skilled in the art are intended to be included within the scope of the following claims.

For instance, although the method was optimized for PDL generated images, it can also be used to compress images from other sources.

Further, the description above focuses on compression of CMYK color images with 8 bits per color channel and 8 bits continuous tone black-and-white images. But anyone skilled in the art will appreciate that it can be modified to compress a multitude of other continuous tone images, such as RGB continuous tone color images, continuous tone color images with more than 4 channels per color value or for images with color channels of a different precision than 8 bits, or other continuous tone single-color (grayscale) images.

Also, the actual code forms as described in the first embodiment and the second embodiment may be replaced by other, similar codes, and those codes of the first embodiment may also be used in the second one and vice versa.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of compressing a digital continuous tone image of pixels situated on scan lines, each pixel having a pixel value defined by at least one color channel value, a color channel value having B bits of precision (B>1), the method producing compressed image data and, for a current pixel to be encoded, said current pixel having an actual pixel value, said method comprising the steps of:
   predicting a predicted pixel value based on pixel values of at least one previously processed pixel from the same image, using a fixed rule;
   determining a difference parameter based on a difference value of said predicted pixel value and the actual pixel value of said current pixel to be encoded;
   inspecting the difference parameter for existence of an uninterrupted series of highest order bits having a value equal to zero; and
   removing at least part of said highest order zero bits, and, if a number of bits within predetermined limits remains, generating a compression code having a predetermined fixed length, said code being selected from a predetermined set of compression codes based on the number of remaining non-zero bits.

2. The method of claim 1, wherein a compression code includes a code type denominator and a number of remaining bits denominator.

3. The method of claim 1, further comprising the step of generating at least one data code in addition to said compression code and including said remaining bits in the data code or codes.

4. The method of claim 1, wherein the step of determining a difference parameter based on a difference value of said predicted pixel value and the actual pixel value includes the step of mapping said difference value onto a mapped difference value that is unique for each possible difference value and that has a small value for a small absolute value of said difference value.

5. The method of claim 3, wherein the compression codes and the data codes all include an equal, fixed number of bits.

6. The method of claim 5, wherein said codes each include 4 bits.

7. The method of claim 3, wherein the data codes include a variable number of bits.

8. The method of claim 1, wherein the pixel values are defined by at least 2 color channels, each color channel having B bits of precision, and wherein in the step of determining a color difference parameter, each pixel value is first transformed by a decorrelation transformation according to a predetermined scheme.

9. The method of claim 1, wherein the pixel values are defined by at least 2 color channels, each color channel having B bits of precision, and wherein the step of determining a difference parameter further includes the step of combining the difference values per color channel or difference values of transformed pixel values per color channel, respectively, by concatenating the bits of said difference values per color channel according to a predetermined permutation scheme.

10. The method of claim 1, wherein the pixel value of the previously encoded neighbor pixel on the same scan line is used as said predicted pixel value.

11. The method of claim 1, further comprising the step of checking if the actual pixel value of the current pixel to be encoded is equal to that of a previously encoded pixel situated on the same scan line and separated from the current pixel by one pixel having a pixel value different than the pixel value of the current pixel or by a plurality of pixels all having equal pixel values different than the pixel value of the current pixel, and if so, generating a dedicated generic code for that current pixel.

12. The method of claim 1, further comprising a run-length encoding step, wherein a current pixel to be compressed is compared to a specific predetermined one of its previously processed neighbor pixels, and if their pixel values are equal, repeating said comparing step for the next pixel to be encoded, thereby maximizing a run-length of pixels on the same scanline, that have a value equal to their specific predetermined neighbour pixels, respectively, and generating a run-length code for those pixels, said run-length code including one or more bit groups of a fixed length, each including a code type denominator and a run-length denominator specifying the run-length of said run-length encoding step in a bit-representation.

13. The method of claim 12, wherein, when the run-length bit-representation is longer than can be accommodated in one run-length denominator, the run-length bit-representation is divided over the run-length denominators of successive bit groups.

14. A method of decompressing compressed image data, the compressed image data including a data block including plural data bits and a code block including plural codes for each image line of pixels, each pixel having a color value, the method comprising the steps of:
  reconstructing the color values of the pixels by decoding successive codes in the code block, while
  for a current code,
    checking a code type denominator included in the current code for being one of a predetermined set of compression codes, and, if said code type denominator denominates the code as a compression code from the predetermined set,
    deducting a number from the code type denominator of the current code and reading that number of data bits from the data block,
    calculating a predicted color value, using a predictor, for a current pixel related to the current code, and
    reconstructing the color value of the current pixel from the predicted color value in combination with a difference value based on the data bits read from the data block.

15. The method of decompressing compressed image data according to claim 14, further comprising the step of checking a code type denominator included in a current code and, if said code type denominator denominates the code as a run-length code, searching for all immediately following codes that have the same code type denominator as the current code, checking runlength denominators included in the codes thus found and forming a runlength by concatenating the run-length denominators.

16. A non-transitory computer-readable medium containing a computer program comprising computer-executable instructions for executing a method of compressing a digital continuous tone image of pixels situated on scan lines, each pixel having a pixel value defined by at least one color channel value, a color channel value having B bits of precision (B>1), the method producing compressed image data and, for a current pixel to be encoded, said current pixel having an actual pixel value, said method comprising the steps of:

predicting a predicted pixel value based on pixel values of at least one previously processed pixel from the same image, using a fixed rule;
determining a difference parameter based on a difference value of said predicted pixel value and the actual pixel value of said current pixel to be encoded;
inspecting the difference parameter for existence of an uninterrupted series of highest order bits having a value equal to zero; and
removing at least part of said highest order zero bits, and, if a number of bits within predetermined limits remains, generating a compression code having a predetermined fixed length, said code being selected from a predetermined set of compression codes based on the number of remaining non-zero bits.

17. An apparatus for compressing a digital continuous tone image of pixels situated on scan lines, each pixel having a pixel value defined by at least one color channel value, a color channel value having B bits of precision (B>1), the apparatus producing compressed image data and comprising:
  an encoding processor that encodes a current pixel, said current pixel having an actual pixel value;
  a predictor processor that predicts a predicted pixel value based on pixel values of at least one previously processed pixel from the same image, using a fixed rule;
  a difference parameter determinator processor that determines a difference parameter based on a difference value of said predicted pixel value and the actual pixel value of said current pixel to be encoded;
  a checking processor that inspects the difference parameter for existence of an uninterrupted series of highest order bits having a value equal to zero; and
  a cutting-off processor that removes at least part of said highest order zero bits, and, if a number of bits within predetermined limits remains,
  a compression code generator processor that generates a compression code having a predetermined fixed length, said code being selected from a predetermined set of compression codes based on the number of remaining non-zero bits.

18. The apparatus according to claim 17, further comprising:
  a run-length checker processor that compares a current pixel to be compressed to a specific predetermined one of its previously processed neighbor pixels, and if their pixel values are equal, repeating the comparing for the next pixel to be encoded, thereby maximizing a run-length of pixels on the same scanline, that have a value equal to their specific predetermined neighbour pixels, respectively; and
  a run-length code generator processor that generates a run-length code for those pixels found by the run-length checker processor by including in said run-length code one or more bit groups of a fixed length, each including a code type denominator processor and a run-length denominator processor specifying the run-length of said run-length encoding step in a bit-representation.

19. The apparatus of claim 18, wherein the run-length code generator processor, when the run-length bit-representation is longer than can be accommodated in one run-length denominator processor, divides the run-length bit-representation over the run-length denominator processors of successive bit groups.

* * * * *